US011235393B2

(12) United States Patent
Murao

(10) Patent No.: US 11,235,393 B2
(45) Date of Patent: Feb. 1, 2022

(54) ADDITIVE MANUFACTURING APPARATUS AND METHOD OF PRODUCING THREE-DIMENSIONALLY SHAPED OBJECT

(71) Applicant: CANON KABUSHIKI KAISHA, Tokyo (JP)

(72) Inventor: Hitoshi Murao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 15/834,329

(22) Filed: Dec. 7, 2017

(65) Prior Publication Data

US 2018/0169757 A1    Jun. 21, 2018

(30) Foreign Application Priority Data

Dec. 16, 2016  (JP) .............................. JP2016-244810

(51) Int. Cl.
*B22F 10/00*   (2021.01)
*B33Y 10/00*   (2015.01)
*B29C 64/40*   (2017.01)
*B22F 10/47*   (2021.01)
*B33Y 70/00*   (2020.01)
(Continued)

(52) U.S. Cl.
CPC .............. *B22F 12/00* (2021.01); *B22F 10/47* (2021.01); *B29C 64/40* (2017.08); *B33Y 10/00* (2014.12); *B33Y 30/00* (2014.12); *B33Y 40/00* (2014.12); *B33Y 50/02* (2014.12); *B33Y 70/00* (2014.12);
(Continued)

(58) Field of Classification Search
CPC ......... B22F 3/1055; B22F 10/00; B29C 64/40
See application file for complete search history.

(56) References Cited

U.S. PATENT DOCUMENTS 9,524,357 B1 * 12/2016 Webster ................. G06F 17/50
2004/0228754 A1 * 11/2004 Abe ........................ B22F 3/004
                                                                        419/6
(Continued)

FOREIGN PATENT DOCUMENTS

EP      3 278 908 A1        2/2018
JP      2015-096646 A       5/2015
WO      WO-2014174090 A2 *  10/2014     ............ B28B 1/001

OTHER PUBLICATIONS

Extended European Search Report in European Application No. 17202992.8 (dated May 22, 2018).

*Primary Examiner* — Anthony J Zimmer
*Assistant Examiner* — Sean P. O'Keefe
(74) *Attorney, Agent, or Firm* — Venable LLP

(57) ABSTRACT

A method of producing a three-dimensionally shaped object includes a step of equipping an additive manufacturing apparatus with a plate, a step of forming a support portion by depositing raw material powder on the plate and radiating light, a step of forming a three-dimensionally shaped object by depositing raw material powder on the support portion and radiating light, and a step of separating the three-dimensionally shaped object from the support portion. In the step of forming the support portion, a low-density support portion and a high-density support portion are formed. The low-density support portion has a lower density than a three-dimensionally shaped portion formed in the step of forming the three-dimensionally shaped object. The high-density support portion has a higher density than the low-density support portion.

19 Claims, 10 Drawing Sheets

(51) Int. Cl.
*B33Y 30/00* (2015.01)
*B33Y 40/00* (2020.01)
*B33Y 50/02* (2015.01)
*B22F 12/00* (2021.01)
*B22F 10/10* (2021.01)

(52) U.S. Cl.
CPC ........... *B22F 10/10* (2021.01); *B22F 2999/00* (2013.01); *Y02P 10/25* (2015.11)

(56) References Cited

U.S. PATENT DOCUMENTS

| | | | |
|---|---|---|---|
| 2012/0041586 A1* | 2/2012 | Abe | B22C 9/061 |
| | | | 700/120 |
| 2013/0065073 A1* | 3/2013 | Fuwa | C22C 33/0285 |
| | | | 428/548 |
| 2015/0104346 A1 | 4/2015 | Nakamura et al. | |
| 2015/0145169 A1* | 5/2015 | Liu | B33Y 10/00 |
| | | | 264/308 |
| 2015/0197862 A1* | 7/2015 | Engel | C23F 1/08 |
| | | | 75/246 |
| 2016/0001505 A1* | 1/2016 | Hakkaku | B41J 3/4073 |
| | | | 264/255 |
| 2016/0229127 A1* | 8/2016 | Halliday | B29C 67/0092 |
| 2016/0306901 A1* | 10/2016 | Ainsworth | B33Y 50/00 |
| 2016/0311024 A1* | 10/2016 | Thiel | G05B 19/4099 |
| 2017/0312822 A1* | 11/2017 | Kimblad | B22F 3/008 |

* cited by examiner

ADDITIVE MANUFACTURING APPARATUS AND METHOD OF PRODUCING THREE-DIMENSIONALLY SHAPED OBJECT

BACKGROUND OF THE INVENTION

Field of the Invention

The present invention relates to a method of producing a three-dimensionally shaped object using so-called selective laser sintering, and to an additive manufacturing apparatus used therefor.

Description of the Related Art

In recent years, so-called 3D printers have been actively developed, and various methods have been attempted. For example, various methods such as fused deposition modeling, stereolithography using photocurable resin, and selective laser sintering are known.

Selective laser sintering is a method of forming a three-dimensionally shaped object by repetitively performing steps of depositing raw material powder of, for example, nylon resin, ceramics, or metal layer by layer and selectively sintering part of a powder layer by irradiating the powder layer with laser light. In recent years, selective laser sintering using metal powder as a raw material has been used as a method of producing a product for which a high mechanical strength or a good thermal conductivity is required.

For example, Japanese Patent Laid-Open No. 2015-96646 proposes a method of producing a three-dimensionally shaped object formed from metal and having gloss on the surface thereof.

In the case where a three-dimensionally shaped object is formed directly on a shaping table of a three-dimensionally shaping apparatus by selective laser sintering, the three-dimensionally shaped object adheres to the shaping table, and it becomes difficult to separate the three-dimensionally shaped object from the shaping table. Therefore, a method of using a detachable plate for the shaping table and forming a three-dimensionally shaped object on the plate is employed.

Even in the case of using the plate, there is a problem that the three-dimensionally shaped object is damaged when separating the three-dimensionally shaped object from the plate if a target three-dimensionally shaped object is directly formed on the plate because part of the three-dimensionally shaped object adheres to the plate. However, if it is attempted to deposit a thick powder layer on the plate and form a three-dimensionally shaped object on the powder layer, a three-dimensionally shaped object having a desired shape cannot be formed because a sintered body is not fixed to the plate and thus moves on the powder layer and is warped due to thermal deformation.

Therefore, a base is formed on the plate by selective laser sintering, and then a three-dimensionally shaped object having a desired shape is formed on the base. In this case, the three-dimensionally shaped object is separated from the base after formation thereof, and, since the base is formed from a hard sintered body having the same quality as the three-dimensionally shaped object, cutting is performed along a cutting line on the base side so as not to damage the three-dimensionally shaped object when cutting off the three-dimensionally shaped object by using a cutting tool such as a wire cutter. When it is attempted to ensure that the damage is prevented at the time of cutting, a large part of the base remains on the three-dimensionally shaped object. Therefore, there arises necessity to perform additional processing such as fine cutting and polishing, which are time-consuming operations, to remove the part of the base adhering to the three-dimensionally shaped object.

SUMMARY OF THE INVENTION

According to a first aspect of the present invention, a method of producing a three-dimensionally shaped object includes a step of equipping an additive manufacturing apparatus with a plate, a step of forming a support portion by depositing raw material powder on the plate and radiating light, a step of forming a three-dimensionally shaped object by depositing raw material powder on the support portion and radiating light, and a step of separating the three-dimensionally shaped object from the support portion. In the step of forming the support portion, a low-density support portion and a high-density support portion are formed. The low-density support portion has a lower density than a three-dimensionally shaped portion formed in the step of forming the three-dimensionally shaped object. The high-density support portion has a higher density than the low-density support portion.

According to a second aspect of the present invention, an additive manufacturing apparatus includes an irradiation optical system comprising a light source, a powder deposition device configured to deposit powder of a shaping material, and a controller configured to perform a process of causing the powder deposition device to deposit powder of a shaping material, a process of forming a support portion by causing the irradiation optical system to radiate light, and a process of forming a three-dimensionally shaped portion on the support portion by causing the irradiation optical system to radiate light. In the process of forming the support portion, a low-density support portion and a high-density support portion are formed. The low-density support portion has a lower density than the three-dimensionally shaped portion formed in the process of forming the three-dimensionally shaped portion. The high-density support portion has a higher density than the low-density support portion.

Further features of the present invention will become apparent from the following description of exemplary embodiments with reference to the attached drawings.

DESCRIPTION OF THE EMBODIMENTS

Figure 1:
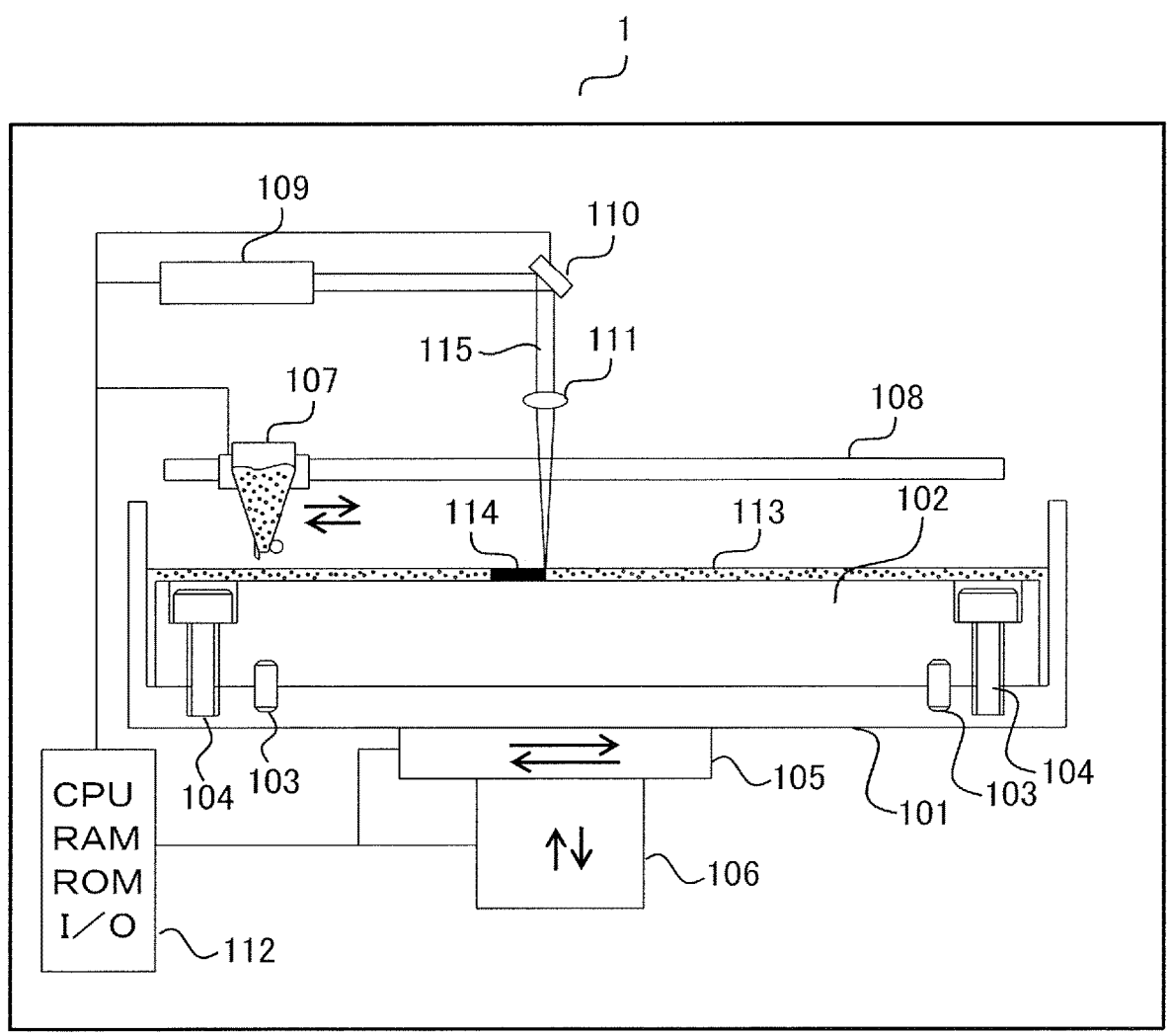
FIG. 1 is a schematic section view of an additive manufacturing apparatus of exemplary embodiments.

Exemplary embodiments of an additive manufacturing apparatus and a method of producing a three-dimensionally shaped object will be described below with reference to drawings. To be noted, although the term "sintering" sometimes refers to a phenomenon of a collective body of solid powder being heated at a temperature below a melting point thereof and thereby turning into a fine object called as a sintered body, this term is used in wider definition in the description below. That is, sintering refers to heating a collective body of solid powder and thereby establishing a unified state thereof, and includes a case of heating the collective body to a temperature above the melting point.

First Exemplary Embodiment

Additive Manufacturing Apparatus

First, an additive manufacturing apparatus 1 used in the present exemplary embodiment will be described with reference to FIG. 1.

A shaping table 101 is a table for mounting a plate 102 thereon, and includes pins 103 serving as positional standards. The plate 102 is positioned by fitting the pins 103 in pin holes of the plate 102. In the present exemplary embodiment, the plate 102 is fixed to the shaping table 101 by screws 104. To be noted, the plate 102 does not have to have a plate-like shape as long as the plate 102 functions as a support stage for forming a three-dimensionally shaped object, and how the plate 102 is fixed to the shaping table 101 is not limited to this example. The shaping table 101 is supported by a horizontal movement mechanism 105 and a vertical movement mechanism 106 so as to be movable in the horizontal direction and the vertical direction.

A powder deposition device 107, a movement guide 108, a laser light source 109, a scanner 110, and a condensing lens 111 are disposed above the shaping table 101. The powder deposition device 107 is a device for depositing powder serving as a raw material to a predetermined thickness, and is supported by the movement guide 108 so as to be movable in the horizontal direction. The laser light source 109, the scanner 110, and the condensing lens 111 constitute an irradiation optical system for locally and selectively irradiating a raw-material powder layer with laser light.

A controller 112 is a computer for controlling operations of the additive manufacturing apparatus 1, and includes a central processing unit: CPU, a read-only memory: ROM, a random access memory: RAM, an input/output port: I/O port, and so forth. The ROM stores an operation program for the additive manufacturing apparatus 1. The I/O port is connected to an external apparatus and a network, and, for example, data necessary for three-dimensional shaping can be input from and output to an external computer. The data necessary for three-dimensional shaping include shape data of a three-dimensionally shaped object to be formed, information about a material to be used for the formation, and shape data of each sintered layer, that is, slice data. The slice data may be received from the external computer or generated by the CPU in the controller 112 on the basis of the shape data of the three-dimensionally shaped object and stored in the RAM.

The controller 112 is connected to various components such as the horizontal movement mechanism 105 and the vertical movement mechanism 106 of the shaping table 101, the powder deposition device 107, the laser light source 109, the scanner 110, and the condensing lens 111, controls operations of these components, and performs processing related to shaping.

Next, a basic operation of the additive manufacturing apparatus 1 will be described. After the plate 102 is mounted on the shaping table 101, the additive manufacturing apparatus 1 performs the following operations to form a sintered powder portion. First, the controller 112 transmits an instruction to the horizontal movement mechanism 105 and the vertical movement mechanism 106 to move the shaping table 101 to an initial position for performing a shaping operation.

Next, the controller 112 transmits an instruction to the powder deposition device 107 to deposit raw material powder on the plate 102 to form a first raw-material powder layer 113. When forming a powder layer, the powder deposition device 107 deposits powder while moving above the shaping table 101 along the movement guide 108.

After the first powder layer 113 is formed, the controller 112 transmits instructions to the horizontal movement mechanism 105, the laser light source 109, the scanner 110, and the condensing lens 111, irradiates a part of the raw-material powder layer 113 to be sintered with laser light and thereby sinters the irradiated part. Laser light 115 radiated from the laser light source 109 is scanned in a direction perpendicular to a sheet surface of FIG. 1 by the scanner 110. This direction will be referred to as a main scanning direction. The laser light 115 is condensed into a very small region in the powder layer 113 by the condensing lens 111, thereby a part corresponding to the region is locally heated, and the locally heated part of the powder layer 113 is sintered. A direction in which the shaping table 101 is moved by the horizontal movement mechanism 105, that is, a left-right direction in FIG. 1, will be referred to as a sub-scanning direction. A sintered portion 114 can be formed by irradiating an arbitrary part of the powder layer 113 with laser light by turning the laser light source 109 on and off while performing scanning in both the main scanning direction and the sub-scanning direction. The controller 112 causes radiation of laser light in accordance with a shape pattern of the first layer to be formed to sinter the powder.

After sintering of the first layer is completed as described above, the controller 112 transmits an instruction to the vertical movement mechanism 106 to move down the shaping table 101 by a distance corresponding to a thickness of one layer, and further transmits an instruction to the powder deposition device 107 to deposit a second raw-material powder layer. Subsequently, the controller 112 transmits instructions to the horizontal movement mechanism 105, the laser light source 109, the scanner 110, and the condensing lens 111, and causes radiation of laser light in accordance with a shape pattern of the second layer to form a sintered portion of the second layer. Sintered portions of respective layers are sequentially formed by repetitively performing similar steps, and thereby formation of layers is performed.

To be noted, the additive manufacturing apparatus 1 of the present exemplary embodiment can control, by controlling radiation of laser light when forming the sintered portion, the density of the sintered portion to be formed as will be described later. To change the density of the sintered portion, the energy density of laser light to irradiate the powder layer is changed. In the case where the energy density is increased, the local temperature of a part irradiated with the laser light is increased, the raw material powder takes a state closer to a fused state, and the void between particles of the raw-material powder becomes smaller, and thus the density increases. Conversely, in the case where the energy density of the laser light to be radiated is decreased, although particles of the powder are fused and connected to one another at contact portions thereof, the density does not increase because the void between the particles still remains large.

Here, energy density (J/mm$^2$) of laser light to irradiate a powder layer corresponds to an amount of energy applied to a unit area, and is calculated by the following equation:

$$E = p/(v \times d).$$

In the equation, E represents energy density (J/mm$^2$), p represents laser beam output (W), v represents scanning speed (mm/s), and d represents beam spot diameter (mm) of laser light irradiating a portion of a powder layer corresponding to a scanning pitch.

The energy density of the radiated laser light is changed by the controller 112 appropriately changing a part or all of the emission intensity of the laser light source 109, the scanning speed of the scanner 110, focus control of the condensing lens 111, and the movement speed of the horizontal movement mechanism 105.

The controller 112 stores, as a control table, in the ROM, and for each kind of powder material to be used for shaping, driving conditions of each component described above for controlling the density after sintering to a desired value.

As another method of changing the density of the sintered portion, there is a method of changing a deposition state of a powder layer by controlling the operation of the powder deposition device 107. For example, the packing density of the powder can be controlled by softly depositing the powder to increase the ratio of void or pressing the powder with a roller after deposition to increase the packing density. In the case where the packing density of the powder is controlled and the powder is sintered by laser light at an irradiation intensity small enough not to fuse the particles, a sintered body having a density reflecting the packing density of the powder can be formed.

In the present exemplary embodiment or other exemplary embodiments, the density of the sintered portion may be controlled by controlling the packing density of the powder instead of controlling the energy density of the radiated laser light. Further, by performing control of the packing density of the powder and control of the energy density of the radiated laser light in combination, the controllable range of the density of the sintered body can be widened.

Method of Production

A method of producing a product according to the present exemplary embodiment will be described with reference to FIGS. 1 to 5C. FIG. 2 is a flowchart illustrating steps of the method of production. In the description below, the final form of a production target object may be referred to as a product. In addition, in an object formed on a plate by selective laser sintering, a portion corresponding to the product will be referred to as a shaped portion or a three-dimensionally shaped object. Further, a portion connecting the plate and the shaped portion, that is, a portion supporting the three-dimensionally shaped object, will be referred to as a support portion.

First, shape data of a product to be produced is prepared in step S1 of FIG. 2. The shape data of the product is input from a three-dimensional computer-aided design system: 3DCAD system or a three-dimensional scanner through the I/O port of the controller 112, and is stored in the RAM.

Next, the shape of a support portion that supports the shaped portion when the additive manufacturing apparatus forms the shaped portion is designed in step S2 of FIG. 2. For example, in the case of forming a product having a rectangular parallelepiped shape whose shape in side view is illustrated in FIG. 3, that is, a shaped portion 30, a support portion that supports the shaped portion 30 needs to be formed between a plate and the shaped portion 30.

Figure 3:
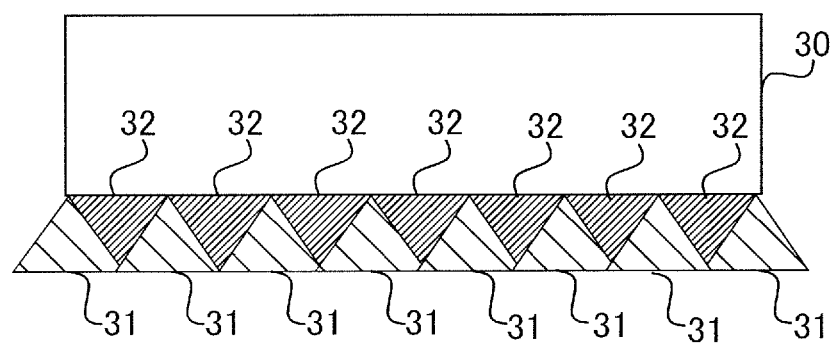
FIG. 3 is a schematic section view of a support portion and a shaped portion of a first exemplary embodiment.

In the present exemplary embodiment, as illustrated in FIG. 3, a support portion having a structure of a combination of a high-density support portion 31 and a low-density support portion 32 is used. The high-density support portion 31 has a density higher than the density of the low-density support portion 32 and equal to or lower than the density of the three-dimensionally shaped object.

The high-density support portion 31 is constituted by a sintered body having a density higher than 90% and equal to or lower than 100% with respect to the density of a sintered body that constitutes the shaped portion 30. The low-density support portion 32 is constituted by a sintered body having a density equal to or lower than 90% with respect to the density of the sintered body that constitutes the shaped portion 30. More desirably, the low-density support portion 32 is constituted by a sintered body having a density equal to or higher than 60% and equal to or lower than 80% with respect to the density of the sintered body that constitutes the shaped portion 30.

In the case where a sintered body has a higher density, the mechanical strength and the thermal conductivity thereof are also higher. The high-density support portion 31 has a strength sufficient as a base for forming the shaped portion 30 by sintering, and has a function of dissipating heat to the plate.

The low-density support portion 32 is formed as a brittle material having a low mechanical strength, and thus the support portion can be easily separated from the shaped portion 30 after forming the shaped portion 30. For example, a crack can be easily generated in the low-density support portion 32 by applying an appropriate impact force thereto. Since it is not appropriate for forming the shaped portion 30 that bonding between particles after sintering is too weak or the thermal conductivity is too low, it is desirable that the density of the low-density support portion 32 is equal to or higher than 60%. Meanwhile, in the case where the density is too high, the mechanical strength becomes too high and it becomes less easy to separate the shaped portion 30. Therefore, it is desirable that the density is equal to or lower than 80%.

Further, in the present exemplary embodiment, the low-density support portion 32 constituted by a low-density sintered object is configured to be in contact with most part of the bottom surface of the shaped portion 30 such that the shaped portion 30 can be easily separated from the support portion. That is, as shown in the side view of FIG. 3, the high-density support portion 31 is formed to include plural pyramid-shaped structures so as to be in contact with the shaped portion 30 at the apices of the pyramid-shaped structures.

Next, shape data of each layer necessary for the additive manufacturing apparatus to deposit each layer, that is, slice data of the support portion and the shaped portion 30, is prepared in step S3 of FIG. 2. The slice data may be received from an external computer through the I/O port, or may be generated by the CPU of the controller 112 based on the shape data of the shaped portion 30 and the support portion and stored in the RAM. With regard to the support portion, slice data is generated for each of the high-density support portion 31 and the low-density support portion 32. By preparing the slice data for the high-density support portion 31 and the low-density support portion 32, the controller 112 can appropriately change the operations of the irradiation optical system and the horizontal movement mechanism 105, and sintered portions having different densities can be formed in predetermined shapes.

Next, the plate 102 is positioned and fixed to the additive manufacturing apparatus 1 in steps S4 of FIG. 2.

Figure 4A:
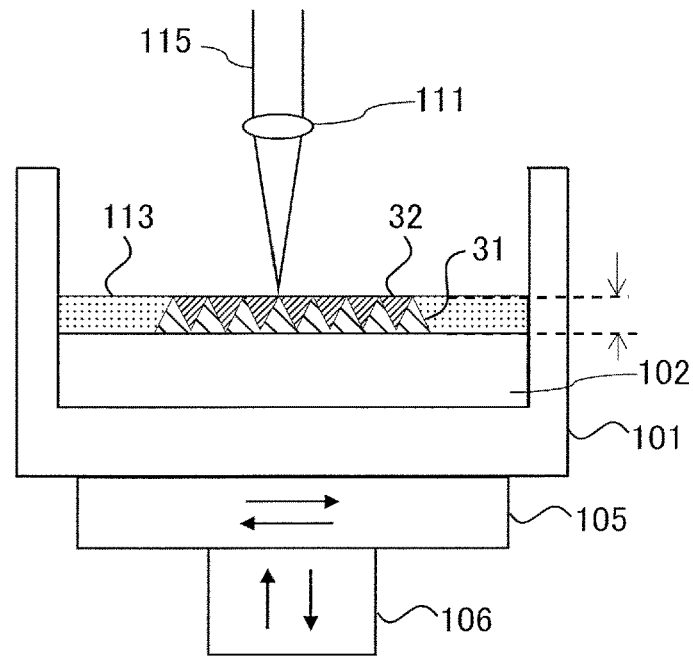
FIG. 4A is a schematic diagram illustrating formation of the support portion of the first exemplary embodiment.

Next, the additive manufacturing apparatus 1 forms the support portion on the plate 102 in step S5 of FIG. 2. FIG. 4A is a section view schematically illustrating a state in which the additive manufacturing apparatus 1 is forming the support portion. As described with reference to FIG. 1, the additive manufacturing apparatus 1 forms a sintered portion of one layer by depositing a layer of raw material powder and irradiating the raw material powder with laser light in accordance with the slice data. Although schematic illustration is given in FIG. 4 for the sake of convenience of illustration, the actual raw material powder includes fine particles with a particle diameter in the range of several micrometers to several tens of micrometers, and the powder layer is a thin layer having a thickness of about several tens of micrometers for one layer. Therefore, in the case of, for example, forming a support portion having a height of 2.52 mm, tremendous number of layers are deposited.

When forming each layer, the controller 112 changes the energy density of the radiated laser light appropriately in accordance with the slice data, and thus the high-density support portion 31 and the low-density support portion 32 are formed. That is, the controller 112 transmits instructions to the horizontal movement mechanism 105, the laser light source 109, the scanner 110, and the condensing lens 111 to change the energy density of the laser light to irradiate the powder layer, and thus the high-density support portion 31 and the low-density support portion 32 are formed.

Figure 4B:
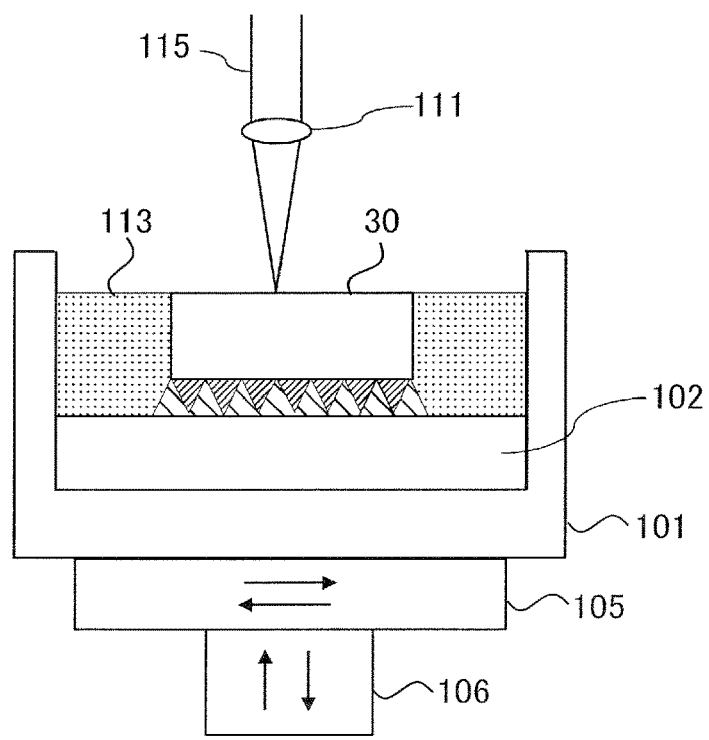
FIG. 4B is a schematic diagram illustrating formation of the shaped portion of the first exemplary embodiment.

After formation of the support portion is completed, the additive manufacturing apparatus 1 forms the shaped portion 30 corresponding to the product on the support portion in step S6 of FIG. 2. FIG. 4B is a section view schematically illustrating a state in which the additive manufacturing apparatus 1 is forming the shaped portion 30. When forming the shaped portion 30, the strength of the shaped portion 30 is increased by setting the energy density of the laser light to irradiate the powder layer to be sufficiently high to reduce the void in the sintered portion as much as possible such that the density of the shaped portion 30 is in the range of 99.5% to 99.9% of the density of a bulk material.

Figure 5A:
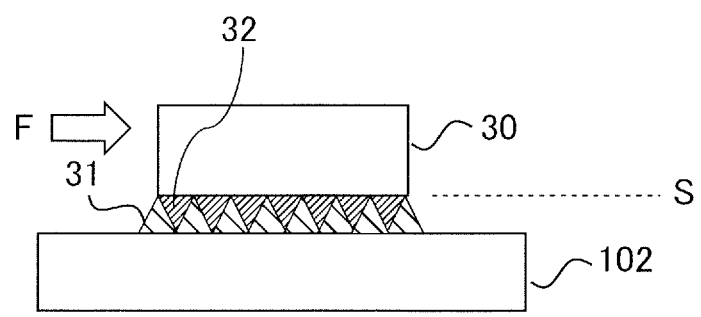
FIG. 5A is a schematic diagram illustrating a detached plate of the first exemplary embodiment.

After formation of the shaped portion 30 is completed, the plate 102 is detached from the additive manufacturing apparatus 1 in step S7 of FIG. 2. As illustrated in FIG. 5A, the high-density support portion 31 and the low-density support portion 32 adhere to the detached plate 102 together with the shaped portion 30.

Next, the plate 102 to which the support portion and the shaped portion 30 adhere is moved to a heat processing apparatus, and internal stress accumulated in the three-dimensionally shaped object is relieved by heat treatment in step S8 of FIG. 2.

When performing three-dimensional shaping by selective laser sintering, sintering is performed at a high temperature. However, the dimension of the three-dimensionally shaped object changes due to reduction of the temperature after completion of the shaping. The influence of this dimensional change can be reduced by relieving the internal stress accumulated in the three-dimensionally shaped object by heat treatment.

Therefore, in the present exemplary embodiment, by annealing, that is, performing heat treatment on a completed product fixed to the plate 102 via the support portion, the stress is relieved while retaining the shape. For example, in the case where the material is iron-based, treatment of gradually cooling down the material from 500° C. is performed as stress-relief annealing. To be noted, even if the dimension of the three-dimensionally shaped object changes, this heat treatment step can be omitted in the case where the change in dimension is within a range acceptable for the specification of the product.

Next, the shaped portion 30 is separated from the support portion in step S9 of FIG. 2. In the present exemplary embodiment, most part of the bottom surface of the shaped portion 30 adheres to the low-density support portion 32. As has been described, the low-density support portion 32 can be easily separated, due to the brittleness thereof, from the shaped portion 30 having a higher mechanical strength. For example, by applying an appropriate impact force F illustrated in FIG. 5A to the shaped portion 30, breakage can be easily generated along a dotted line S. Of course, the shaped portion 30 may be held and separation may be performed by applying an impact force F to the support portion. Alternatively, the low-density support portion 32 that is brittle may be cut off along the dotted line S by using a cutting tool such as a wire cutter.

Figure 5B:
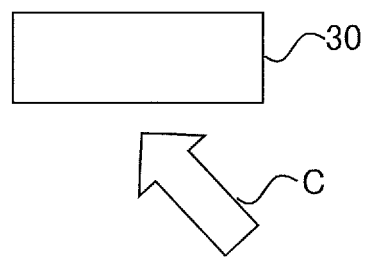
FIG. 5B is a schematic diagram illustrating removal of remaining matter from a product of the first exemplary embodiment.
Figure 5C:
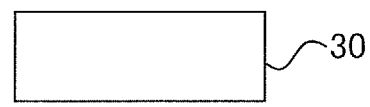
FIG. 5C is a schematic diagram illustrating a completed product.

Remaining matter adhering to the separated shaped portion 30, that is, the product, is removed in step S10 of FIG. 2. As illustrated in FIG. 5B, a complete product illustrated in FIG. 5C is obtained by performing finishing processing on the bottom surface of the product by applying blast processing C such as sand blast thereto. Since there is a case where hardly any remaining matter adheres to the product when separation is performed in step S9 in the present exemplary embodiment, step S10 may be omitted in this case.

According to the present exemplary embodiment, a support portion is constituted by a high-density support portion including plural pyramid-shaped structures and by a low-density support portion, and shaping is performed such that most part of a shaped portion is in contact with the low-density support portion. In addition, the area in which the high-density support portion is in contact with the shaped portion is smaller than the area in which the high-density support portion is in contact with a plate. As a result of this, the shaped portion can be separated from the support portion very easily. In addition, even if remaining matter derived from the support portion adheres to a product after separation, the amount thereof is small, and removing the remaining matter is very easy.

To be noted, although the high-density support portion including plural pyramid-shaped structures and the low-density support portion are used in combination in the first exemplary embodiment, shapes such as conical shapes, polygonal pyramid shapes, and wedge shapes extending in a one-dimensional direction may be also employed as long as the high-density support portion has triangular sectional shapes. In addition, the apices do not have to be sharp pointing tips, and may have trapezoidal shapes in which the tip portions have certain areas.

Second Exemplary Embodiment

Contrary to the first exemplary embodiment in which the high-density support portion including plural pyramid-shaped structures and the low-density support portion are used in combination, in a second exemplary embodiment, a high-density support portion including plural columnar structures and a lattice-shaped low-density support portion are used in combination. A product is formed in accordance with the flowchart of FIG. 2 also in the present exemplary embodiment.

Figure 2:
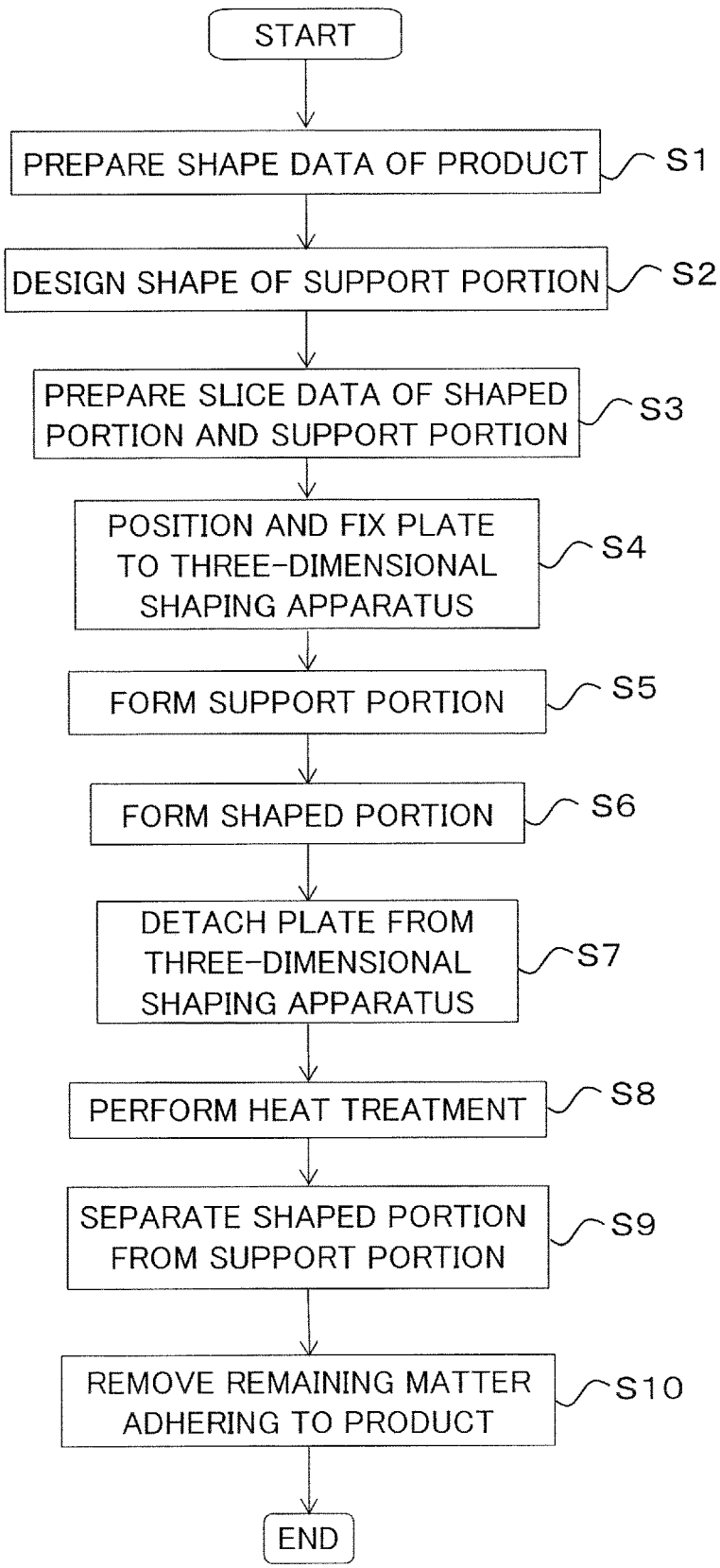
FIG. 2 is a flowchart of a three-dimensional shaping method of exemplary embodiments.
Figure 6A:
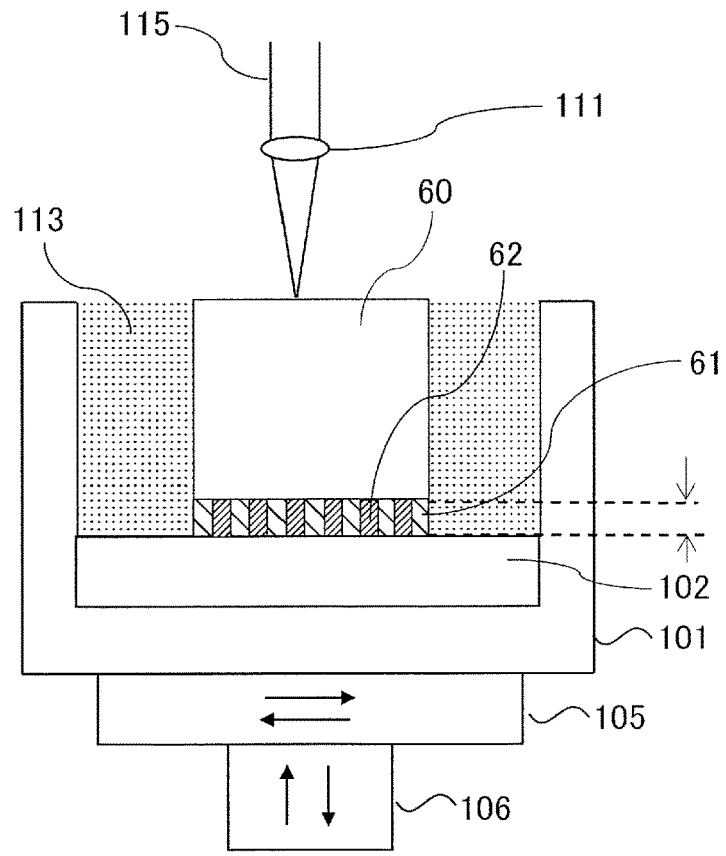
FIG. 6A is a schematic diagram illustrating a shaping step of a second exemplary embodiment.

FIG. 6A schematically illustrates a state in which the additive manufacturing apparatus 1 illustrated in FIG. 1 is forming a support portion and a shaped portion of the second exemplary embodiment. The same components as FIG. 1 are denoted by the same reference signs, and the description thereof will be omitted. FIG. 6A illustrates a shaped portion 60, a high-density support portion 61, and a low-density support portion 62. The shaped portion 60 is a three-dimensionally shaped object corresponding to the product to be formed.

Figure 6B:
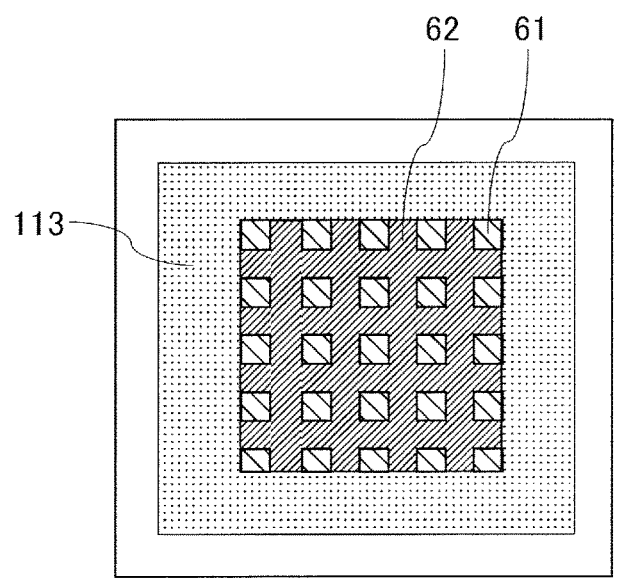
FIG. 6B is a schematic diagram illustrating a shape of a support portion of the second exemplary embodiment in plan view.

FIG. 6B schematically illustrates the shape of support portion in plan view viewed from above for the sake of easier understanding of the shape of the high-density support portion 61 and the low-density support portion 62.

As illustrated in FIGS. 6A and 6B, in the present exemplary embodiment, the high-density support portion 61 includes plural columnar structures each having a rectangular parallelepiped shape. Further, the low-density support portion 62 having a lattice shape is disposed so as to surround the high-density support portion 61. Since the columnar structures of the high-density support portion 61 are arranged in such a manner that the columnar structures are uniformly dispersed in plan view, heat can be efficiently dissipated to the plate 102 when forming the shaped portion 60, and stress strain can be prevented from being unevenly distributed. In addition, the area in which the columnar structures of the high-density support portion 61 are in contact with the shaped portion 60 is small, and thus each columnar structure can be easily separated from the shaped portion 60 when separating the shaped portion 60 from the support portion in step S9 of FIG. 2.

To further facilitate the operation of separating a shaped portion from a support portion, in the present exemplary embodiment, the ratio of a portion in which the low-density support portion 62 is in contact with the shaped portion 60 in the area in which the high-density support portion 61 and the low-density support portion 62 are in contact with the shaped portion 60 is defined. That is, it is preferable that the ratio of the portion in which the low-density support portion 62 is in contact with the shaped portion 60 in the area in which the high-density support portion 61 and the low-density support portion 62 are in contact with the shaped portion 60 is equal to or higher than 40%. Therefore, in the example of FIG. 6B, the shapes of the support portion are configured such that the ratio of the portion in which the low-density support portion 62 is in contact with the shaped portion 60 in the area in which the high-density support portion 61 and the low-density support portion 62 are in contact with the shaped portion 60 is about 70%.

According to the present exemplary embodiment, a support portion is constituted by a high-density support portion including plural columnar structures and a lattice-shaped low-density support portion, and shaping is performed such that 40% or more of the bottom surface of a shaped portion is in contact with the low-density support portion. As a result of this, the shaped portion can be separated from the support portion very easily. In addition, remaining matter derived from the support portion and adhering to the product after separation can be also removed very easily.

Third Exemplary Embodiment

Contrary to the first exemplary embodiment in which the high-density support portion including plural pyramid-shaped structures and the low-density support portion are used in combination, in a third exemplary embodiment, a shaped portion is supported by only a low-density support portion. A product is formed in accordance with the flowchart of FIG. 2 also in the present exemplary embodiment.

Figure 7A:
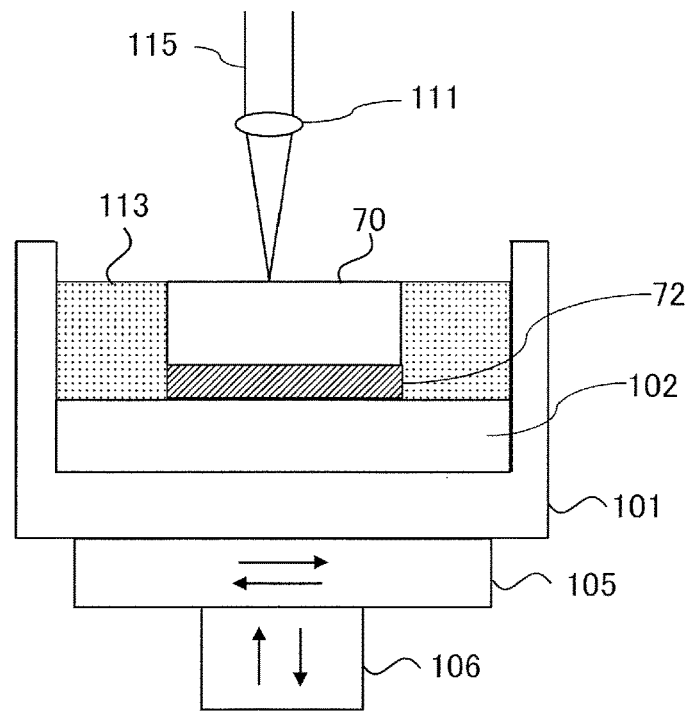
FIG. 7A is a schematic diagram illustrating a shaping step of a third exemplary embodiment.

FIG. 7A schematically illustrates a state in which the additive manufacturing apparatus 1 illustrated in FIG. 1 is forming a support portion and a shaped portion of the third exemplary embodiment. The same components as FIG. 1 are denoted by the same reference signs, and the description thereof will be omitted. FIG. 7A illustrates a shaped portion 70, and a low-density support portion 72. The shaped portion 70 corresponds to the product to be formed.

In the present exemplary embodiment, the whole of the support portion is formed from a low-density sintered body having a density of 90% or lower with respect to the density of a sintered body constituting the shaped portion 70. The present exemplary embodiment is particularly effective in the case where the size of the shaped portion 70 is small, and the present exemplary embodiment facilitates the step of designing the support portion in step S2 of FIG. 2.

According to the present exemplary embodiment, the whole of the support portion is constituted by the low-density support portion 72. As a result of this, the shaped portion can be separated from the support portion very easily. In addition, remaining matter derived from the support portion and adhering to the product after separation can be also removed very easily.

Fourth Exemplary Embodiment

Contrary to the first exemplary embodiment in which the high-density support portion including plural pyramid-shaped structures and the low-density support portion are used in combination, in a fourth exemplary embodiment, a shaped portion is supported by depositing a low-density support portion on a high-density support portion. A product is formed in accordance with the flowchart of FIG. 2 also in the present exemplary embodiment.

Figure 7B:
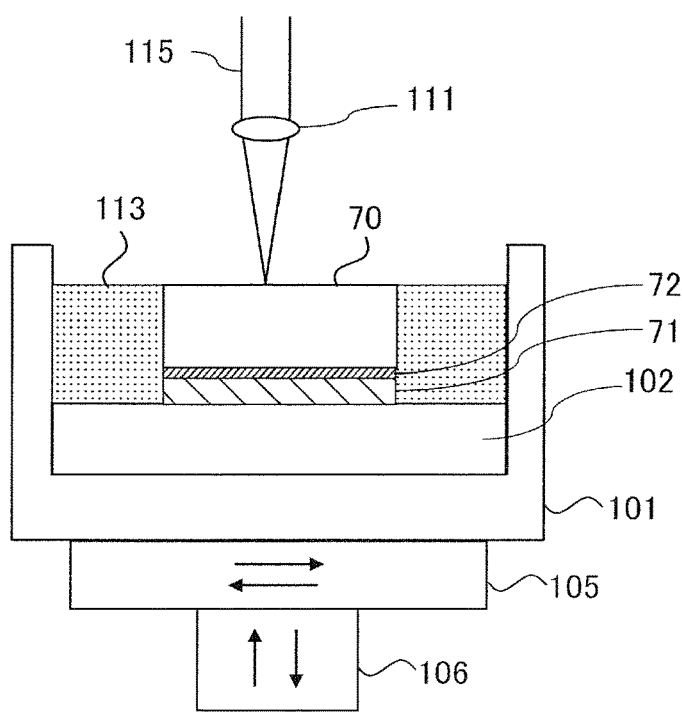
FIG. 7B is a schematic diagram illustrating a shaping step of a fourth exemplary embodiment.

FIG. 7B schematically illustrates a state in which the additive manufacturing apparatus 1 illustrated in FIG. 1 is forming a support portion and a shaped portion of the fourth exemplary embodiment. The same components as FIG. 1 are denoted by the same reference signs, and the description thereof will be omitted. FIG. 7B illustrates a shaped portion 70, a high-density support portion 71, and a low-density support portion 72. The shaped portion 70 corresponds to the product to be formed.

The present exemplary embodiment is particularly effective in the case where the size of the shaped portion 70 is small, and the present exemplary embodiment facilitates the step of designing the support portion in step S2 of FIG. 2.

According to the present exemplary embodiment, a support portion is formed by depositing a low-density support portion on a high-density support portion. As a result of this, the shaped portion can be separated from the support portion very easily. In addition, remaining matter derived from the support portion and adhering to the product after separation can be also removed very easily.

Fifth Exemplary Embodiment

Contrary to the first exemplary embodiment in which the high-density support portion including plural pyramid-shaped structures and the low-density support portion are used in combination, in a fifth exemplary embodiment, a high-density support portion including plural brace-shaped structures and a low-density support portion filling the space in the brace-shaped structures are used in combination. A product is formed in accordance with the flowchart of FIG. 2 also in the present exemplary embodiment.

Figure 8A:
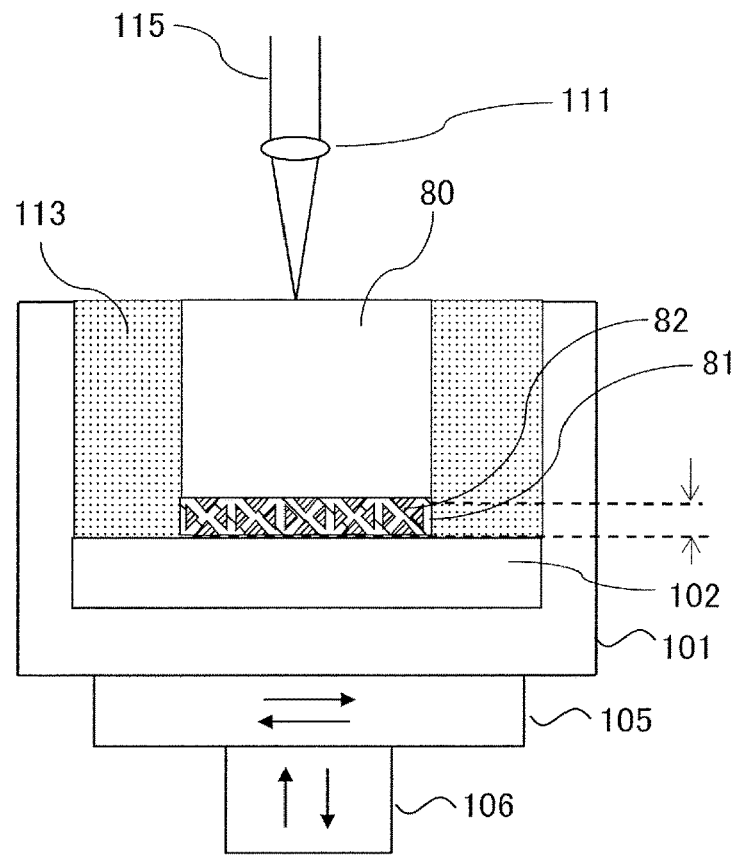
FIG. 8A is a schematic diagram illustrating a shaping step of a fifth exemplary embodiment.

FIG. 8A schematically illustrates a state in which the additive manufacturing apparatus 1 illustrated in FIG. 1 is forming a support portion and a shaped portion of the fifth exemplary embodiment. The same components as FIG. 1 are denoted by the same reference signs, and the description thereof will be omitted. FIG. 8A illustrates a shaped portion 80, a high-density support portion 81, and a low-density support portion 82. The shaped portion 80 corresponds to the product to be formed.

Figure 8B:
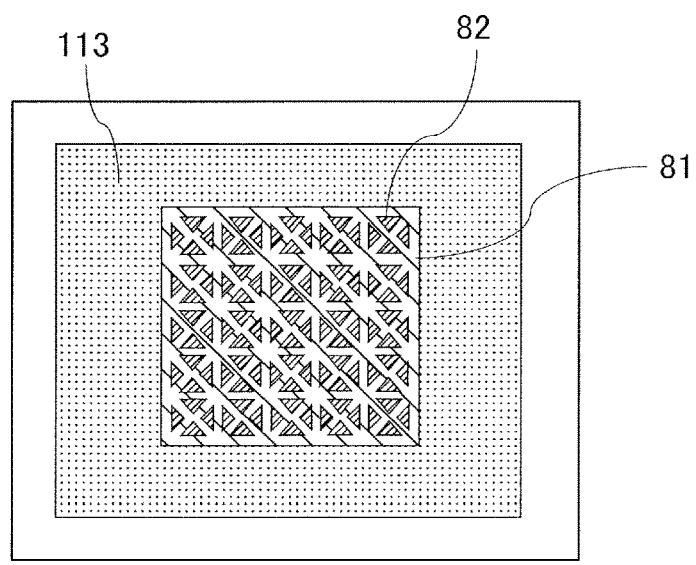
FIG. 8B is a schematic diagram illustrating a shape of a support portion of the fifth exemplary embodiment in plan view.

In addition, FIG. 8B schematically illustrates the shape of the support portion in plan view for the sake of easier understanding of the shape of the high-density support portion 81 and the low-density support portion 82.

As illustrated in FIGS. 8A and 8B, in the present exemplary embodiment, the high-density support portion 81 includes brace-shaped structures. In addition, the low-density support portion 82 is disposed so as to fill the space in the high-density support portion 81. Since the brace-shaped structures of the high-density support portion 81 are arranged in such a manner that the brace-shaped structures are uniformly distributed in plan view, heat can be efficiently dissipated to the plate 102 when forming the shaped portion 80, and stress strain can be prevented from being unevenly distributed. The structural strength of the support portion is high and thermal conductivity to the plate 102 is good in the present exemplary embodiment, and thus the present exemplary embodiment is suitable for a case where the size of the shaped portion 80 is relatively large.

According to the present exemplary embodiment, a support portion is constituted by a combination of a high-density support portion including plural brace-shaped structures and a low-density support portion filling a space in the high-density support portion. As a result of this, a relatively large shaped portion can be formed with a high precision of shape, and the shaped portion can be separated from the support portion very easily. In addition, remaining matter derived from the support portion and adhering to the product after separation can be also removed very easily.

Sixth Exemplary Embodiment

Contrary to the first exemplary embodiment in which the high-density support portion including plural pyramid-shaped structures and the low-density support portion are used in combination, in a sixth exemplary embodiment, a high-density support portion and a low-density support portion having a double layer structure are used in combination. A product is formed in accordance with the flowchart of FIG. 2 also in the present exemplary embodiment.

Figure 9:
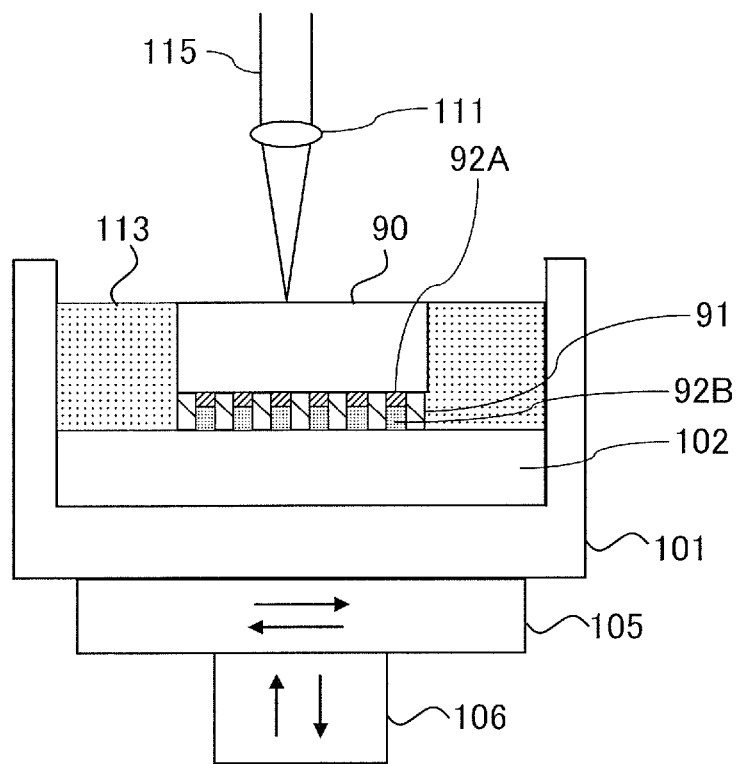
FIG. 9 is a schematic diagram illustrating a shaping step of a sixth exemplary embodiment.

FIG. 9 schematically illustrates a state in which the additive manufacturing apparatus 1 illustrated in FIG. 1 is forming a support portion and a shaped portion of the sixth exemplary embodiment. The same components as FIG. 1 are denoted by the same reference signs, and the description thereof will be omitted. FIG. 9 illustrates a shaped portion 90, a high-density support portion 91, an upper low-density support portion 92A, and a lower low-density support portion 92B. The shaped portion 90 corresponds to the product to be formed.

Also in the present exemplary embodiment, the high-density support portion 91 is constituted by a sintered body having a density higher than 90% and equal to or lower than 100% with respect to the density of a sintered body that constitutes the shaped portion 90. The upper low-density support portion 92A and the lower low-density support portion 92B are constituted by sintered bodies having densities equal to or higher than 60% and equal to or lower than 80% with respect to the density of the sintered body that constitutes the shaped portion 90. However, in the present exemplary embodiment, the density of the upper low-density support portion 92A is set to be lower than the density of the lower low-density support portion 92B. As a result of this, the shaped portion can be separated from the support portion very easily. In addition, remaining matter derived from the support portion and adhering to the product after separation can be also removed very easily.

Seventh Exemplary Embodiment

Contrary to the first to sixth exemplary embodiments in which a support portion is formed only under the bottom surface of a product to be formed, in a seventh exemplary embodiment, the support portion is also formed under the bottom surface of an overhang portion of the product. The product is formed in accordance with the flowchart of FIG. 2 also in the present exemplary embodiment.

Figure 10:
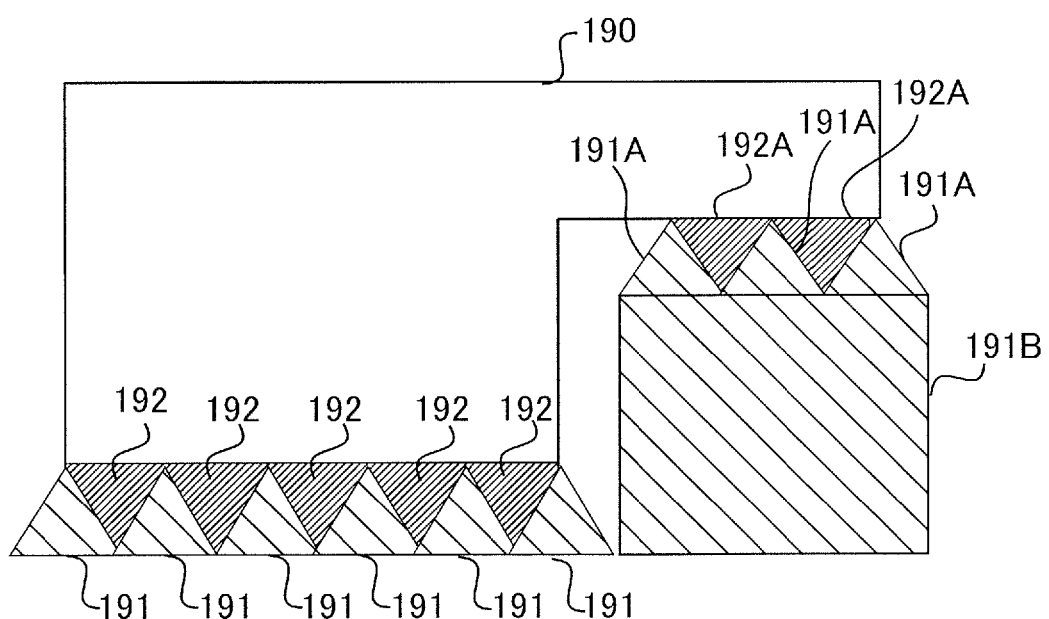
FIG. 10 is a schematic section view of a support portion and a shaped portion of a seventh exemplary embodiment.

FIG. 10 is a diagram schematically illustrating a support portion and a shaped portion of the seventh exemplary embodiment. FIG. 10 illustrates a shaped portion 190, high-density support portions 191, 191A, and 191B, and low-density support portions 192 and 192A. The shaped portion 190 corresponds to a product to be formed, and includes an overhang portion on the right side of FIG. 10. The high-density support portion 191 and the low-density support portion 192 support the bottom surface of the shaped portion 190. The high-density support portion 191B supports the bottom surface of the overhang portion of the shaped portion 190. In addition, the high-density support portion 191A and the low-density support portion 192A are provided on the high-density support portion 191B so as to be in contact with the overhang portion of the shaped portion 190.

According to the present exemplary embodiment, a low-density sintered body is disposed in a support portion that supports the bottom surface of a shaped portion and the bottom surface of an overhang portion in the case of forming a product of a complicated shape including the overhang portion. As a result of this, the shaped portion can be separated from the support portion very easily. In addition, remaining matter derived from the support portion and adhering to the product after separation can be also removed very easily.

Embodiments of the present invention is not limited to the first to seventh exemplary embodiments described above, and may be modified or combined as appropriate. For example, although laser light is two-dimensionally scanned with respect to a powder layer by using a scanner that performs main scanning and a horizontal movement mechanism that performs sub-scanning in the exemplary embodiments described above, the scanning is not limited to this example. The laser light may be two-dimensionally scanned by using a two-axis or three-axis galvanometer scanner without moving a shaping table. In addition, although a laser light source is used as a light source for heating deposited raw material powder in the exemplary embodiments, light to be used does not have to be laser light as long as the energy density of radiated light can be controlled and the radiated light can be scanned. For example, an irradiation optical system using optical elements such as a high intensity lamp, a shutter, a variable focus lens, and a scanning mirror in combination may be used in some case.

According to the embodiments described above, a three-dimensionally shaped object can be easily separated from a base portion when forming the three-dimensionally shaped object by selective laser sintering.

Examples

Next, examples of the present invention will be described. The structure of the support portion, conditions for formation of each portion, results of evaluation, and so forth are collectively shown in Tables 1 to 3 for each of Examples 1 to 16. In the results of evaluation, each evaluation item was evaluated by using four-step rating scales in terms of practicality, and the results are shown in the tables by indicating "excellent" by "A", "good" by "B", "acceptable" by "C", and "not acceptable" by "F". To be noted, in the examples, no evaluation item was evaluated as "not acceptable".

In the evaluation items, "warp" corresponds to evaluation of precision of shape of a shaped portion corresponding to a product. In the case where the strength of the support portion is insufficient, the shaped portion is sometimes deformed and the precision of shape thereof becomes insufficient. This item corresponds to evaluation of this phenomenon. Specifically, the dimension of the shaped portion was measured to evaluate the warp, and thus a case where the amount of warp was equal to or smaller than 0.05 mm is indicated by "A", a case where the amount of warp was larger than 0.05 mm and equal to or smaller than 0.1 mm is indicated by "B", a case where the amount of warp was larger than 0.1 mm and equal to or smaller than 0.3 mm is indicated by "C", and a case where the amount of warp was larger than 0.3 mm is indicated by "F".

In addition, in the case where dissipation of heat to a plate through the support portion is insufficient, the shaped portion corresponding to the product is heated and deformed, and the flatness of the surface is degraded. "Surface roughness" corresponds to evaluation of this phenomenon. The surface roughness of the shaped portion was measured, and thus a case where a maximum height Rz was equal to or smaller than 50 µm is indicated by "A", a case where a maximum height Rz was equal to or smaller than 50 µm is indicated by "A", a case where the maximum height Rz was larger than 50 µm and equal to or smaller than 100 µm is indicated by "B", a case where the maximum height Rz was larger than 100 µm and equal to or smaller than 300 µm is indicated by "C", and a case where the maximum height Rz was larger than 300 µm is indicated by "F".

In addition, "ease of separation" corresponds to evaluation of ease of separating the three-dimensionally shaped object corresponding to the product from the support portion by using an impact force or a cutter. Specifically, the three-dimensionally shaped portion was separated from the support portion by applying a predetermined impact to the support portion by using a tool, and ease of the separation was evaluated by the intensity and number of times of application of the impact required for the separation. A case where the product was damaged by the separation is indicated by "F".

In addition, the density of a sintered portion was measured by cutting off a specimen from the sintered portion by mechanical processing, observing the section thereof by using a microscope, and calculating the packing ratio by image processing. In some case, the density of the sintered portion may be measured cutting off the specimen and by using the Archimedes' method. In the tables, the density of each part of the support portion is indicated in percentage with respect to the density of the three-dimensionally shaped object corresponding to the product.

In Examples 1 to 16 except Example 9, powder of SUS630 having an average particle diameter of 18 µm was used as a shaping material. In Example 9, powder of nylon 12 having an average particle diameter of 50 µm was used as the shaping material. In all the examples in which the powder of SUS630 was used, a fiber laser was used as a light source, and sintering was performed at an ambient temperature of 30° C. In Example 9 in which nylon 12 was used, the ambient temperature was set to 150° C., and a $CO_2$ laser was used as the light source.

In Examples 1 to 9, the thickness of a support layer was set to 2.52 mm, and the product was formed by using a support structure including the high-density support portion including plural columnar structures illustrated in FIG. 6. In addition, in Example 10, the product was formed by using a support structure including the high-density support portion including plural pyramid-shaped structures illustrated in FIG. 3. In Example 11, the product was formed by using a support structure including the high-density support portion including plural brace-shaped structures illustrated in FIG. 8. In Examples 11 to 16, the product was formed by using a support structure including the high-density support portion, the upper low-density support portion, and the lower low-density support portion illustrated in FIG. 9.

Results of evaluation of Examples 1 to 9 in which the high-density support portion including plural columnar structures and a lattice-shaped low-density support portion were used indicated that these examples were good in terms of practicality. The results were good in both cases of using a metal material as in Examples 1 to 8 and using a resin material as in Example 9.

In Example 10, since the high-density support portion was formed to include plural pyramid-shaped structures, the area in which the high-density support portion adhering to the shaped portion was very small. In contrast, the area in which the low-density support portion adhering to the shaped portion was large, and thus Example 10 was excellent in ease of separation.

In Example 11, as a result of forming the high-density support portion to include plural brace-shaped structures, cooling efficiency was improved, and thus a great effect of suppressing the deformation of the surface shape of the shaped portion caused by overheating was achieved and the surface roughness was small. Further, the rigidity of the support portion was improved, and thus a great effect of suppressing the deformation of the shaped portion was achieved and the warp of the shaped portion was small.

In Examples 12 to 16, three parts that are different in density were included in the support portion. Examples 12 to 15 in which the density of the upper low-density support portion was particularly small were excellent in the ease of separation.

TABLE 1

|  |  | Example 1 | Example 2 | Example 3 | Example 4 | Example 5 | Example 6 |
|---|---|---|---|---|---|---|---|
|  | Material | SUS630 | SUS630 | SUS630 | SUS630 | SUS630 | SUS630 |
|  | Average particle diameter of powder (μm) | 18 | 18 | 18 | 18 | 18 | 18 |
|  | Thickness of support layer (mm) | 2.52 | 2.52 | 2.52 | 2.52 | 2.52 | 2.52 |
|  | Ambient temperature (° C.) | 30 | 30 | 30 | 30 | 30 | 30 |
|  | Type of laser | Fiber | Fiber | Fiber | Fiber | Fiber | Fiber |
|  | High-density support portion | Columnar | Columnar | Columnar | Columnar | Columnar | Columnar |
| Sintering conditions of shaped portion | Laser output (W) | 300 | 300 | 300 | 300 | 300 | 300 |
|  | Scanning speed (mm/s) | 2500 | 2500 | 2500 | 2500 | 2500 | 2500 |
|  | Beam diameter (mm) | 0.06 | 0.06 | 0.06 | 0.06 | 0.06 | 0.06 |
|  | Layer pitch (mm) | 0.04 | 0.04 | 0.04 | 0.04 | 0.04 | 0.04 |
|  | Energy density (J/mm2) | 50 | 50 | 50 | 50 | 50 | 50 |
|  | Density of sintered portion (%) | 100 | 100 | 100 | 100 | 100 | 100 |
| Sintering conditions of high-density support portion | Laser output (W) | 300 | 300 | 300 | 275 | 250 | 300 |
|  | Scanning speed (mm/s) | 2500 | 2500 | 2500 | 2500 | 2500 | 2500 |
|  | Beam diameter (mm) | 0.06 | 0.06 | 0.06 | 0.06 | 0.06 | 0.06 |
|  | Layer pitch (mm) | 0.04 | 0.04 | 0.04 | 0.04 | 0.04 | 0.04 |
|  | Energy density (J/mm2) | 50 | 50 | 50 | 46 | 42 | 50 |
|  | Density of sintered portion (%) | 100 | 100 | 100 | 95 | 90 | 100 |
| Sintering conditions of low-density support portion | Laser output (W) | 200 | 90 | 200 | 200 | 200 | 90 |
|  | Scanning speed (mm/s) | 2500 | 3000 | 2000 | 2500 | 2500 | 3000 |
|  | Beam diameter (mm) | 0.08 | 0.06 | 0.08 | 0.08 | 0.08 | 0.08 |
|  | Layer pitch (mm) | 0.04 | 0.04 | 0.04 | 0.04 | 0.04 | 0.04 |
|  | Energy density (J/mm2) | 25.00 | 12.5 | 31.25 | 25.00 | 25.00 | 9.375 |
|  | Density of sintered portion (%) | 75 | 60 | 80 | 75 | 75 | 50 |
| Evaluation | Warp | B | B | B | B | B | B |
|  | Surface roughness | B | B | B | B | B | C |
|  | Ease of separation | B | B | B | B | B | B |

TABLE 2

|  |  | Example 7 | Example 8 | Example 9 | Example 10 | Example 11 |
|---|---|---|---|---|---|---|
|  | Material | SUS630 | SUS630 | Nylon 12 | SUS630 | SUS630 |
|  | Average particle diameter of powder (μm) | 18 | 18 | 50 | 18 | 18 |
|  | Thickness of support layer (mm) | 2.52 | 2.52 | 2.52 | 2.52 | 2.52 |
|  | Ambient temperature (° C.) | 30 | 30 | 150 | 30 | 30 |
|  | Type of laser | Fiber | Fiber | CO2 | Fiber | Fiber |
|  | High-density support portion | Columnar | Columnar | Columnar | Pyramid-shaped | Brace-shaped |
| Sintering conditions of shaped portion | Laser output (W) | 300 | 300 | 70 | 300 | 300 |
|  | Scanning speed (mm/s) | 2500 | 2500 | 12000 | 2500 | 2500 |
|  | Beam diameter (mm) | 0.06 | 0.06 | 0.2 | 0.06 | 0.06 |
|  | Layer pitch (mm) | 0.04 | 0.04 | 0.1 | 0.04 | 0.04 |

TABLE 2-continued

|  |  | Example 7 | Example 8 | Example 9 | Example 10 | Example 11 |
|---|---|---|---|---|---|---|
|  | Energy density (J/mm2) | 50 | 50 | 0.29 | 50 | 50 |
|  | Density of sintered portion (%) | 100 | 100 | 100 | 100 | 100 |
| Sintering conditions of high-density support portion | Laser output (W) | 300 | 200 | 70 | 300 | 300 |
|  | Scanning speed (mm/s) | 2500 | 1750 | 12000 | 2500 | 2500 |
|  | Beam diameter (mm) | 0.06 | 0.08 | 0.2 | 0.06 | 0.06 |
|  | Layer pitch (mm) | 0.04 | 0.04 | 0.1 | 0.04 | 0.04 |
|  | Energy density (J/mm2) | 50 | 36 | 0.29 | 50 | 50 |
|  | Density of sintered portion (%) | 100 | 84 | 100 | 100 | 100 |
| Sintering conditions of low-density support portion | Laser output (W) | 200 | 200 | 20 | 200 | 200 |
|  | Scanning speed (mm/s) | 1750 | 2500 | 12000 | 2500 | 2500 |
|  | Beam diameter (mm) | 0.08 | 0.08 | 0.2 | 0.08 | 0.08 |
|  | Layer pitch (mm) | 0.04 | 0.04 | 0.2 | 0.04 | 0.04 |
|  | Energy density (J/mm2) | 35.71 | 25 | 0.04 | 25 | 25 |
|  | Density of sintered portion (%) | 84 | 75 | 68 | 75 | 75 |
| Evaluation | Warp | B | C | B | B | A |
|  | Surface roughness | B | B | B | B | A |
|  | Ease of separation | C | B | B | A | B |

TABLE 3

|  |  | Example 12 | Example 13 | Example 14 | Example 15 | Example 16 |
|---|---|---|---|---|---|---|
|  | Material | SUS630 | SUS630 | SUS630 | SUS630 | SUS630 |
|  | Average particle diameter of powder (μm) | 18 | 18 | 18 | 18 | 18 |
|  | Thickness of upper low-density support portion (mm) | 0.52 | 0.52 | 0.52 | 0.52 | 0.52 |
|  | Thickness of lower low-density support portion (mm) | 2.00 | 2.00 | 2.00 | 2.00 | 2.00 |
|  | Ambient temperature (° C.) | 30 | 30 | 30 | 30 | 30 |
|  | Type of laser | Fiber | Fiber | Fiber | Fiber | Fiber |
|  | High-density support portion | Columnar | Columnar | Columnar | Columnar | Columnar |
| Sintering conditions of shaped portion | Fiber laser output (W) | 300 | 300 | 300 | 300 | 300 |
|  | Scanning speed (mm/s) | 2500 | 2500 | 2500 | 2500 | 2500 |
|  | Beam diameter (mm) | 0.06 | 0.06 | 0.06 | 0.06 | 0.06 |
|  | Layer pitch (mm) | 0.04 | 0.04 | 0.04 | 0.04 | 0.04 |
|  | Energy density (J/mm2) | 50 | 50 | 50 | 50 | 50 |
|  | Density of sintered portion (%) | 100 | 100 | 100 | 100 | 100 |
| Sintering conditions of high-density support portion | Fiber laser output (W) | 300 | 300 | 300 | 300 | 300 |
|  | Scanning speed (mm/s) | 2500 | 2500 | 2500 | 2500 | 2500 |
|  | Beam diameter (mm) | 0.06 | 0.06 | 0.06 | 0.06 | 0.06 |
|  | Layer pitch (mm) | 0.04 | 0.04 | 0.04 | 0.04 | 0.04 |
|  | Energy density (J/mm2) | 50 | 50 | 50 | 50 | 50 |
|  | Density of sintered portion (%) | 100 | 100 | 100 | 100 | 100 |
| Sintering conditions of lower low-density support portion | Fiber laser output (W) | 200 | 200 | 200 | 200 | 200 |
|  | Scanning speed (mm/s) | 2500 | 2500 | 2500 | 2500 | 2500 |
|  | Beam diameter (mm) | 0.08 | 0.08 | 0.08 | 0.08 | 0.08 |
|  | Layer pitch (mm) | 0.04 | 0.04 | 0.04 | 0.04 | 0.04 |
|  | Energy density (J/mm2) | 25.00 | 25.00 | 25.00 | 25.00 | 25.00 |
|  | Density of sintered portion (%) | 75 | 75 | 75 | 75 | 75 |

TABLE 3-continued

| | | Example 12 | Example 13 | Example 14 | Example 15 | Example 16 |
|---|---|---|---|---|---|---|
| Sintering conditions of upper low-density support portion | Fiber laser output (W) | 50 | 80 | 80 | 40 | 150 |
| | Scanning speed (mm/s) | 2500 | 2500 | 3000 | 2500 | 2500 |
| | Beam diameter (mm) | 0.06 | 0.08 | 0.06 | 0.06 | 0.08 |
| | Layer pitch (mm) | 0.04 | 0.04 | 0.04 | 0.04 | 0.04 |
| | Energy density (J/mm2) | 8.33333 | 10 | 11.1111 | 6.66667 | 18.75 |
| | Density of sintered portion (%) | 40 | 55 | 59 | 30 | 70 |
| Evaluation | Warp | B | B | B | B | B |
| | Surface roughness | B | B | B | C | B |
| | Ease of separation | A | A | A | A | B |

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-244810, filed Dec. 16, 2016, which is hereby incorporated by reference herein in its entirety.

What is claimed is:

1. A method of producing a three-dimensionally shaped object, the method comprising:
   a step of equipping an additive manufacturing apparatus with a plate;
   a step of forming a support portion comprising multiple layers by repetitively depositing raw material powder on the plate and radiating light; and
   a step of forming a first layer of the three-dimensionally shaped object by depositing raw material powder on the support portion and radiating light,
   wherein, in the step of forming the support portion, a low-density support portion and a high-density support portion are formed adjacently in each layer of the multiple layers, the low-density support portion having a lower density than the first layer of the three-dimensionally shaped object, and the high-density support portion having a higher density than the low-density support portion, and
   wherein an area in which the high-density support portion is in contact with the three-dimensionally shaped object is smaller than an area in which the high-density support portion is in contact with the plate.

2. The method according to claim 1, wherein an energy density of the light radiated in the step of forming the support portion is smaller than an energy density of the light radiated in the step of forming the first layer of the three-dimensionally shaped object.

3. The method according to claim 1, wherein a packing ratio of the raw material powder deposited in the step of forming the support portion is smaller than a packing ratio of the raw material powder deposited in the step of forming the first layer of the three-dimensionally shaped object.

4. The method according to claim 1, wherein a density of the low-density support portion formed in the step of forming the support portion is 60% to 80% of a density of the three-dimensionally shaped object formed in the step of forming the first layer of the three-dimensionally shaped object.

5. The method according to claim 1, wherein the high-density support portion comprises a pyramid-shaped or conical structure.

6. The method according to claim 1, wherein the high-density support portion comprises a trapezoidal structure.

7. The method according to claim 1, wherein, in the step of forming the support portion, the support portion is formed by depositing the low-density support portion on the high-density support portion.

8. The method according to claim 1, the method further comprising:
   a step of preparing shape data of the three-dimensionally shaped object; and
   a step of preparing shape data of the high-density support portion and the low-density support portion.

9. The method according to claim 1, wherein the three-dimensionally shaped object is formed such that 40% or more of an area of the three-dimensionally shaped object in contact with the support portion is in contact with the low-density support portion.

10. The method according to claim 1, the method further comprising a step of separating the three-dimensionally shaped object from the support portion.

11. A method of producing a three-dimensionally shaped object, the method comprising:
- a step of equipping an additive manufacturing apparatus with a plate;
- a step of forming a support portion comprising multiple layers by repetitively depositing raw material powder on the plate and radiating light; and
- a step of forming a first layer of the three-dimensionally shaped object by depositing raw material powder on the support portion and radiating light,
- wherein, in the step of forming the support portion, a low-density support portion and a high-density support portion are formed adjacently in each layer of the multiple layers, the low-density support portion having a lower density than the first layer of the three-dimensionally shaped object, and the high-density support portion having a higher density than the low-density support portion, and
- wherein the high-density support portion and the low-density support portion are removably in contact with the three-dimensionally shaped object.

12. The method according to claim 11, wherein an energy density of the light radiated in the step of forming the support portion is smaller than an energy density of the light radiated in the step of forming the first layer of the three-dimensionally shaped object.

13. The method according to claim 11, wherein a packing ratio of the raw material powder deposited in the step of forming the support portion is smaller than a packing ratio of the raw material powder deposited in the step of forming the first layer of the three-dimensionally shaped object.

14. The method according to claim 11, wherein a density of the low-density support portion formed in the step of forming the support portion is 60% to 80% of a density of the three-dimensionally shaped object formed in the step of forming the first layer of the three-dimensionally shaped object.

15. The method according to claim 11, wherein the high-density support portion comprises a pyramid-shaped or conical structure.

16. The method according to claim 11, wherein the high-density support portion comprises a trapezoidal structure.

17. The method according to claim 11, wherein, in the step of forming the support portion, the support portion is formed by depositing the low-density support portion on the high-density support portion.

18. The method according to claim 11, the method further comprising:
- a step of preparing shape data of the three-dimensionally shaped object; and
- a step of preparing shape data of the high-density support portion and the low-density support portion.

19. The method according to claim 11, the method further comprising a step of separating the three-dimensionally shaped object from the support portion.

* * * * *